United States Patent
Kirchhübel et al.

(10) Patent No.: US 8,475,548 B2
(45) Date of Patent: *Jul. 2, 2013

(54) ENTRAINED-FLOW GASIFIER WITH COOLING SCREEN AND BELLOWS COMPENSATOR

(75) Inventors: Volker Kirchhübel, Freiberg (DE); Manfred Schingnitz, Freiberg (DE); Heidrun Toth, Freiberg (DE)

(73) Assignee: Siemens Aktiengesellschaft, München (DE)

( * ) Notice: Subject to any disclaimer, the term of this patent is extended or adjusted under 35 U.S.C. 154(b) by 460 days.

This patent is subject to a terminal disclaimer.

(21) Appl. No.: 12/283,926

(22) Filed: Sep. 16, 2008

(65) Prior Publication Data

US 2009/0077886 A1 Mar. 26, 2009

(30) Foreign Application Priority Data

Sep. 21, 2007 (DE) .......................... 10 2007 045 321

(51) Int. Cl.
*C01J 1/207* (2006.01)
*B01J 7/00* (2006.01)

(52) U.S. Cl.
USPC ................. 48/76; 48/61; 48/127.9; 48/127.1; 48/67; 48/77; 48/78; 48/75; 48/63; 48/69; 48/197 R; 48/198.3; 48/203; 422/242; 422/198; 422/203; 422/205; 422/204

(58) Field of Classification Search
USPC .......... 48/71, 76, 62 R, 63, 64, 77, 69, 127.9, 48/61; 122/5; 422/198, 203–205, 242
See application file for complete search history.

(56) References Cited

U.S. PATENT DOCUMENTS

| | | | |
|---|---|---|---|
| 4,202,672 A | 5/1980 | Schuurman | |
| 4,395,268 A | 7/1983 | Zabelka | |
| 4,818,253 A | 4/1989 | Koehnen et al. | |
| 5,333,574 A * | 8/1994 | Brady et al. | 122/367.1 |
| 5,667,758 A * | 9/1997 | Matsugi et al. | 422/198 |
| 7,037,473 B1 * | 5/2006 | Donner et al. | 422/242 |
| 2007/0079554 A1* | 4/2007 | Schingnitz et al. | 48/210 |
| 2008/0222955 A1* | 9/2008 | Jancker et al. | 48/67 |

FOREIGN PATENT DOCUMENTS

| | | |
|---|---|---|
| DE | 197 18 131 A1 | 11/1998 |
| DE | 102005041931 A1 | 3/2007 |
| EP | 0092192 A2 | 10/1983 |
| EP | 0254830 A2 | 2/1988 |
| EP | 0254830 B1 | 4/1990 |

OTHER PUBLICATIONS

Deutsches Patent—und Markenamt, Aug. 5, 2008, 3 pages.
Noell-Konversionsverfahren; EF-Verlag für Energie- und Umwelttechnik GmbH 1996, Seiten 32-33; J. Carl u. a.
Chinese Patent Office—First Office Action. Jul. 17, 2012 Siemens

* cited by examiner

*Primary Examiner* — Kaity V. Handal

(57) ABSTRACT

In a reactor for the gasification of solid and liquid fuels in the entrained flow at temperatures between 1200 and 1900° C. and pressures between ambient pressure and 10 MPa with an oxidizing agent containing free oxygen, the cooling screen is connected in a gas-tight manner to the pressure shell via a bellows compensator to accommodate linear deformation. Continuous sweeping by gas of the annular gap between pressure shell and cooling screen is unnecessary and backflow by producer gas is prevented.

3 Claims, 1 Drawing Sheet

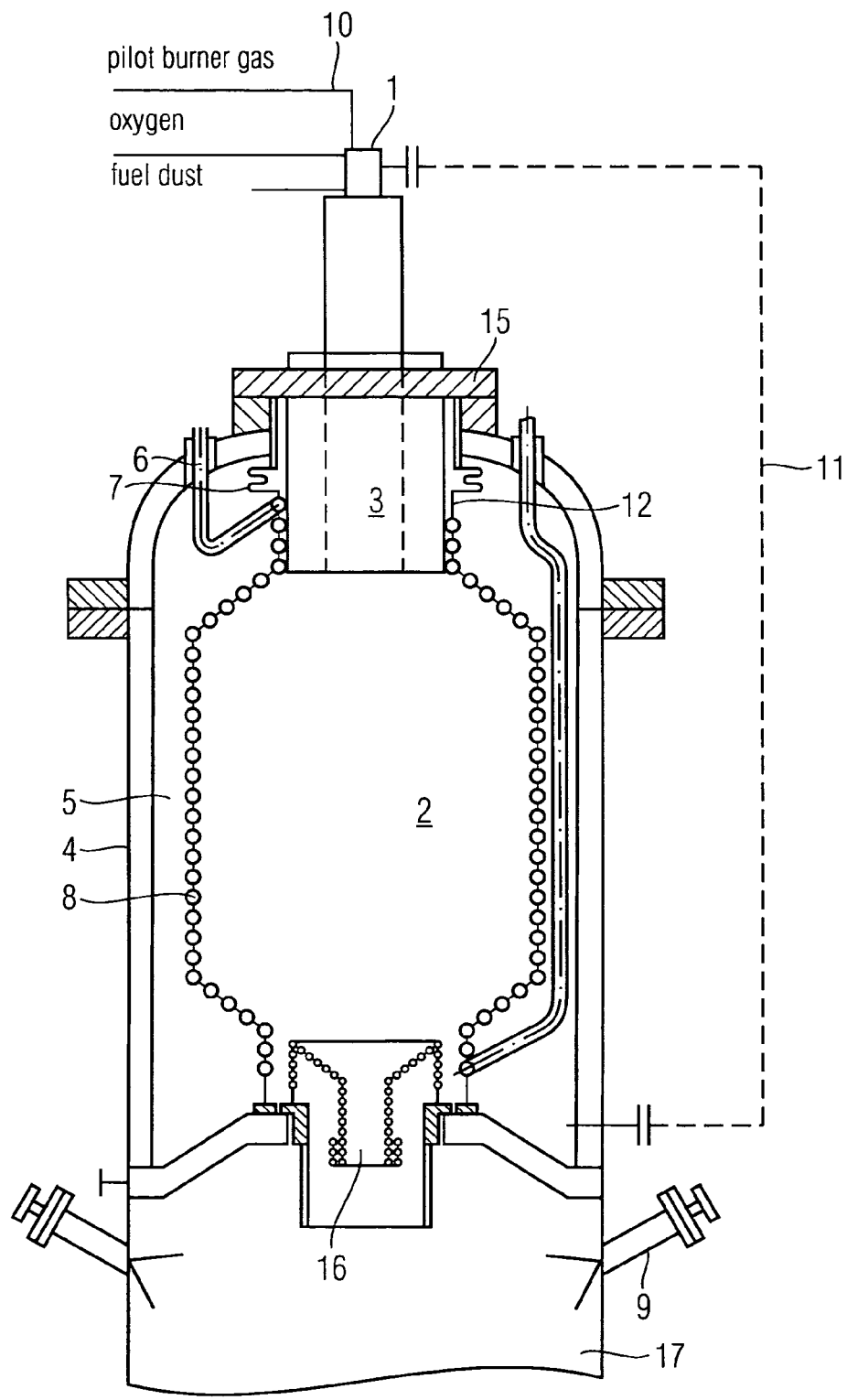

ENTRAINED-FLOW GASIFIER WITH COOLING SCREEN AND BELLOWS COMPENSATOR

CROSS REFERENCE TO RELATED APPLICATIONS

This application claims the benefits of German application No. 10 2007 045 321.5 filed Sep. 21, 2007 and is incorporated by reference herein in its entirety.

FIELD OF INVENTION

The invention concerns a reactor for the gasification of solid and liquid fuels in the entrained flow, with the features of the claims.

BACKGROUND OF THE INVENTION

The invention relates to a reactor for the entrained-flow gasification of different solid and liquid fuels with an oxidizing agent containing free oxygen under normal or increased pressure up to 8 MPa. Here solid fuels are pulverized coal dust from coals of differing ranks, petrol cokes and other pulverizable solids having a calorific value exceeding 7 MJ/Nm$^3$. Liquid fuels are oils or oil-solids or water-solids suspensions, such as coal-water slurries, for example. Autothermal entrained-flow gasification has been known for many years in gas generation technology using solid fuels. In this case the ratio of fuel to oxygenic gasification agent is chosen so that temperatures are obtained which are above the melting point of ash. The ash is then melted to a liquid slag which leaves the gasification chamber along with the producer gas or separately and is then directly or indirectly cooled. Such a device is disclosed in DE 197 181 317 A1.

A detailed description of one such gasification reactor fitted with a cooling screen can be found in J. Carl et al, NOELL CONVERSION PROCESS, EF-Verlag for Power and Environmental Engineering GmbH 1996, pages 32-33. In the design described there, a cooling screen consisting of gas-tight, welded cooling tubes is located inside a pressure vessel. This cooling screen is supported on a false bottom and can freely expand upwards. This ensures that the different temperatures due to start-up and shut-down processes and the resulting changes in length which occur, do not result in mechanical stresses which could possibly lead to destruction. In order to achieve this, there is no fixed connection at the upper end of the cooling screen, but a gap between the collar of the cooling screen and the burner flange, which ensures free movement. In order to prevent backflow in the cooling screen gap during pressure fluctuations in the producer gas system, the cooling screen gap is swept with a dry, condensate-free and oxygen-free gas. As practical experience shows, backflow with producer gas occurs in spite of sweeping—resulting in corrosion on the rear side of the cooling screen or on the pressure shell. This can lead to operational failures or even destruction of the cooling screen or pressure shell.

SUMMARY OF INVENTION

The object of the present invention is to avoid the cited disadvantages.

According to the invention, these disadvantages are overcome by means of the solution stated in the claims.

According to the invention, a permanent connection between the cooling screen and the pressure shell or the upper reactor flange is proposed, which makes continuous sweeping with gas unnecessary and prevents backflow by producer gas. The permanent connection between cooling screen and pressure shell is gas-tight and allows movement between cooling screen and pressure shell in the direction of the central axis of the reactor.

In another embodiment, technical measures are illustrated for the pressure regime between the gasification chamber and the cooling screen gap.

BRIEF DESCRIPTION OF THE DRAWINGS

The invention is explained below by way of an exemplary embodiment to aid understanding, and with the aid of a figure, in which:

FIG. 1 shows an inventive seal with a bellows compensator for compensating temperature-related linear deformation.

DETAILED DESCRIPTION OF INVENTION 50 t of coal dust and 35,000 Nm$^3$ of steam, which are converted in the gasification chamber 2 to 75,000 Nm$^3$ of raw syngas at 3 MPa (30 bar) are fed per hour via a gasification burner 1, which also contains a pilot burner, to a gasification reactor as shown in FIG. 1. The gasification burner 1 is arranged in a burner mounting device 3 which is situated near the cover flange 15. The gasification chamber 2 is bounded by a cooling screen 8 fanned by gas-tight, welded cooling tubes. The gasification temperature measured at the outlet device 16 is 1500° C. The hot producer gas along with the liquid slag resulting from the coal ash leaves the gasification chamber 2 via the outlet device 16 and reaches the cooling chamber 17, in which the raw producer gas is cooled to approximately 200° C. by being sprayed with cold water via the nozzles 9 and simultaneously being saturated with steam. The cooled raw gas is then fed to further gas conditioning technologies. An annular gap which has to be protected against underpressure and excessive overpressure, is located between the pressure shell 4 of the gasification reactor and the cooling screen 8. On the other hand it is advisable to maintain a low overpressure of 1 to 2 bar with respect to the gasification chamber 2. This is achieved, for example, by establishing a connection 11 from the pilot fuel gas 10 to the annular gap 5. Since the pressure loss of the pilot fuel gas 10 in the burner is 1 to 2 bar, the slight overpressure in the annular gap 5 is assured by the connection 11. Naturally, this slight overpressure can also be provided by another gas source, for example from a nitrogen supply. In order to establish gas-tightness between the annular gap 5 and the gasification chamber 2, a permanent connection 12 is made to the pressure shell 4 at the upper end of the cooling screen 8. The permanent connection between cooling screen and pressure shell allows movement between the cooling screen and the pressure shell in the direction of the central axis of the reactor. In order to eliminate linear deformation of the cooling screen, which can occur during temperature variations in the gasification chamber 2, a bellows compensator 7 is built into the permanent connection 12 between the cooling screen 8 and the pressure shell 4. The bellows compensator, which is essentially cylindrical, can be expanded or compressed in the direction of its central axis.

The resulting gap between the upper end of the cooling screen 8 and the burner mounting unit 3 is filled during assembly. The cooling water for the cooling screen 8 is fed in via the supply 6.

The invention claimed is:

1. A reactor for the gasification of solid and liquid fuels in an entrained-flow at temperatures between 1200 and 1900° C. and pressures between ambient pressure and 10 MPa, comprising:
   a burner comprising a burner outlet;
   a pressure shell;
   a cooling screen comprising cooling tubes enclosing a gasification chamber, comprising a first end fixed with respect to the pressure shell and defining an outlet, and a second end associated with the burner outlet, wherein the second end is free to thermally expand in a direction of a central axis of the reactor, and wherein the first end, the second end, the burner outlet, and the cooling screen are disposed concentric with the reactor central axis;
   a bellows compensator concentric with the reactor central axis and connected to the cooling screen second end, configured to accommodate thermal expansion of the cooling screen wherein the pressure shell and cooling screen are separated by an annular gap disposed therebetween, wherein the bellows compensator maintains gas-tightness between the annular gap and the gasification chamber, and
   a fluid conduit that provides fluid communication between pilot burner fuel gas upstream of the burner and the annular gap, effective to enable pressurization of the annular gap with pilot burner fuel gas,
   wherein the reactor operates with an oxidizing agent containing free oxygen and on fuels selected from the group consisting of: finely-pulverized coals of differing ranks, petrol cokes, other solid carbonaceous materials, oils, oil-solids and water-solids suspensions, and
   wherein an overpressure with respect to the gasification chamber is established and maintained in the annular gap between the pressure shell and the cooling screen by the fluid conduit such that the reactor operates with a steady state pressure difference.

2. The reactor as claimed in claim 1, wherein the bellows compensator encloses the burner in a concentric manner.

3. The reactor as claimed in claim 1, wherein the annular gap between the pressure shell and the cooling screen is pressurized via an external gas supply.

* * * * *